Aug. 16, 1932.        M. E. STALLSMITH        1,871,808

VEHICLE SHIPPING DEVICE

Filed July 9, 1928

Inventor

Marion E. Stallsmith

By Blackmore, Spencer & Flint

Attorneys

Patented Aug. 16, 1932

1,871,808

UNITED STATES PATENT OFFICE

MARION E. STALLSMITH, OF DETROIT, MICHIGAN, ASSIGNOR TO GENERAL MOTORS CORPORATION, OF DETROIT, MICHIGAN, A CORPORATION OF DELAWARE

VEHICLE SHIPPING DEVICE

Application filed July 9, 1928. Serial No. 291,337.

This invention relates to a device used in connection with motor vehicles while they are being shipped in freight cars.

An object of the invention is to provide a simple and inexpensive device which may be used for holding the springs of the vehicles in compressed position with respect to the vehicle frame, in order that the overall height of the vehicle may be lessened. In order to be able to load as many vehicles as possible in a freight car for shipment, some of the vehicles are sometimes mounted in such a position that their front ends are raised up as high as possible and another vehicle is placed under the up-raised front end of the first vehicle. In certain types of freight cars where the roof height is under average, it is necessary to compress the springs on the vehicle which is mounted in inclined position, thus raising the front axle and wheels toward the frame, so that the height from the bottom of the axle or wheels to the top of the radiator will be lessened, in order that a proper amount of clearance between the freight car roof and the radiator of the inclined vehicle may be obtained.

A further object of the device is to prevent movement of the vehicle chassis and body relative to the wheels and axles during transit, since the freight car is very apt to receive severe shocks during shipment and if the vehicle springs are not tied down with respect to the frame, these shocks are apt to cause serious injury to parts of the vehicle.

Other objects and advantages will be apparent upon referring to the specifications and accompanying drawing in which.

Figure 1:
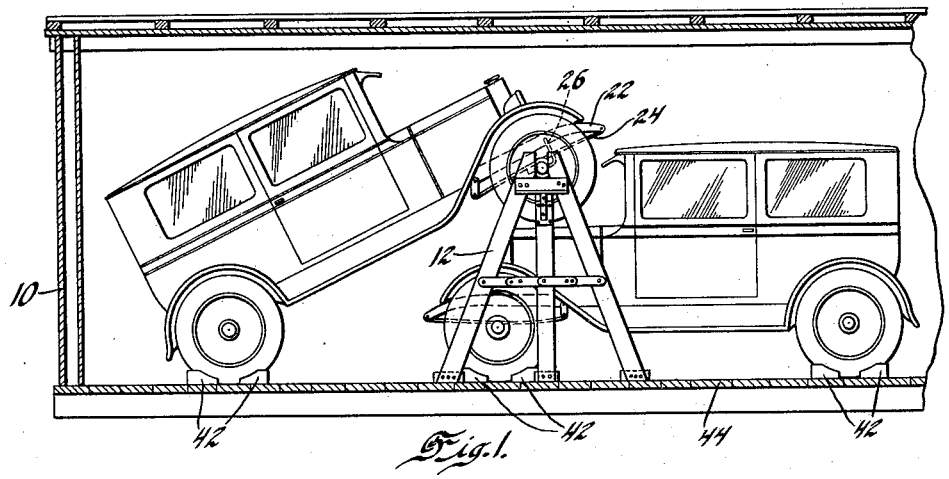
Figure 1 is a longitudinal vertical section through a freight car, showing my improved device applied to one of the vehicles.

The reference numeral 10 indicates a freight car within which vehicles are loaded for shipment. In order to get as many vehicles as possible in the freight car, some of the vehicles are very often mounted in an inclined position such as is shown in Fig. 1. The front axle is supported in a raised position by means of a support 12, and another vehicle is located partly under the up-raised front of the first vehicle. It is necessary to locate the vehicles as close to each other as possible in order to be able to get them into the freight car. Since there will necessarily be some movement of the vehicle relative to the freight car, caused by shocks encountered by the latter during transit, a reasonable amount of space must be left between the top of the body and the car roof as well as between the top of the radiator and car roof, and also between the bottom of the front wheels and axle of the inclined vehicle and the top of the hood of the vehicle which is located under it.

Figure 2:
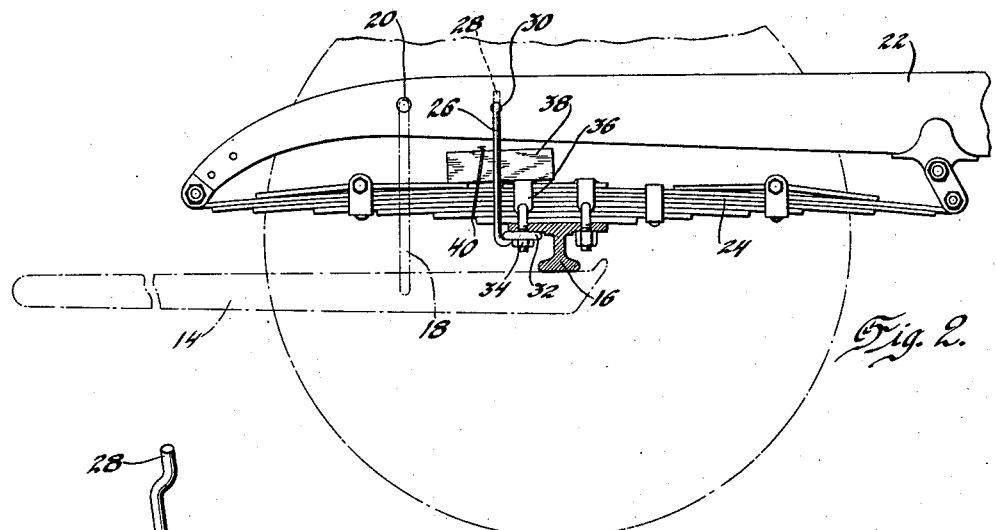
Figure 2 is a fragmentary longitudinal sectional view of the front portion of a vehicle, on a larger scale, showing in detail the manner of assembling the device.

In order to reduce the height from the bottom of the front wheels to the top of the radiator of the vehicle which is in inclined position, it is desirable to compress the front springs. This is accomplished by pressing a bar 14 under the front axle 16 as shown in Fig. 2. Connected with the bar 14 is a link 18, the upper end of which is inserted in an opening 20 in the vehicle frame 22. It will be readily seen that by pressing downwardly on the outer end of the bar 14, the latter will fulcrum about the point where the link 18 is pivoted to it and will force the front axle 16 upwardly, thereby causing the vehicle spring 24 to assume a substantially straight or compressed position with respect to the frame, and thus reduce the distance between the bottom of the front wheels and the top of the radiator.

Figure 3:
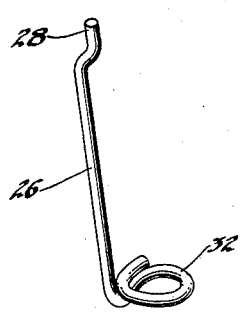
Figure 3 is a detailed perspective view of the device.

In order to hold the springs in compressed position, I have provided a rod 26 which is best shown in Fig. 3. The upper end of this rod is offset as at 28 and is adapted to be inserted through an opening 30 provided in the vehicle frame 22. The lower end of the rod 26 is formed into a ring 32. In order to assemble the rod 26, the offset end 28 is first passed through the opening 30 and the axle 16 is forced upwardly by the bar 14 until the spring 24 almost touches the frame 22. The lower end of the rod 26 is then placed in such a position that as the axle 16 is permitted to move downwardly, the ring 32 will slip over a nut 34, threaded on a spring clip 36, which connects the vehicle spring 24 with the axle 16. A block 38 is then secured to the upper side of the spring 24 by means of a wire 40, for the purpose of preventing a sufficient upward movement of the spring 24, such as might be caused by shocks during transit, as would permit the ring 32 to accidentally slip over the nut 34.

It will be readily seen that since the spring 24 normally tends to assume its original curved position, that ring 32 will be positively held in place around the nut 34 and that there is no possibility of the rod 26 becoming accidentally disengaged during shipment. Obviously the rod 26 is very cheap to manufacture, and very simple to assemble or remove. When it is desired to remove the rod 26, before placing the vehicle in service, the block 38 is first removed and next the bar 14 is again used to force the axle 16 and the spring 24 upwardly sufficiently far to permit the ring 32 to be slipped off of the nut 34, after which the offset end 28 may be removed from the opening 30 in the frame.

Another advantage of this device is that it prevents springing up and down of the vehicle during transit. The vehicle is usually held in position in the freight car by means of wheel blocks 42 which are secured to the car floor 44. If the chassis were not prevented from moving relative to the axles, there would be a constant movement of the chassis relative to the axles during transit. This is very objectionable since it not only causes wear of the spring shackles and other parts of the vehicle but is also apt to result in serious injury to them. By positively tying the vehicle chassis and the axles together with a device such as the rod 26, this relative movement is eliminated.

In the drawing I have shown the device used in connection with the front springs of the vehicle which is in inclined position, but it may be used in connection with either the front or rear springs, and may be used on a vehicle which is mounted in a horizontal position on the car floor if necessary, either for the purpose of reducing the height of the vehicle or for preventing movement of the chassis relative to the axles, or both.

It is thought from the foregoing taken in connection with the accompanying drawing, that the construction and operation of the device will be apparent to those skilled in the art, and that various changes in size, shape, and proportion and details of construction may be made without departing from the spirit and scope of the appended claims.

I claim:

1. In combination, a vehicle frame having an opening therein, an axle, a spring connecting said axle to said frame, a bolt securing said spring to said axle, and a bar having its upper end offset and adapted to fit into said opening, the lower end of said bar being bent into a ring adapted to fit over said bolt for the purpose of holding said spring in compressed position relative to said frame.

2. In combination, a vehicle frame having an opening therein, an axle, a spring connecting said axle to said frame, a bolt securing said spring to said axle, a bar having its upper end offset and adapted to fit into said opening, the lower end of said bar being bent into a ring adapted to fit over said bolt for the purpose of holding said spring in compressed position relative to said frame, and a block secured between said frame and said spring after the latter is in compressed position for the purpose of limiting movement of said spring toward said frame.

In testimony whereof I affix my signature.

M. E. STALLSMITH.